(12) United States Patent
Obara et al.

(10) Patent No.: US 8,059,640 B2
(45) Date of Patent: Nov. 15, 2011

(54) MULTISTAGE SWITCH CONTROL CIRCUIT

(75) Inventors: Hitoshi Obara, Akita (JP); Masato Sakata, Akita (JP)

(73) Assignee: National University Corporation Akita University, Akita (JP)

( * ) Notice: Subject to any disclaimer, the term of this patent is extended or adjusted under 35 U.S.C. 154(b) by 358 days.

(21) Appl. No.: 12/521,114

(22) PCT Filed: Dec. 20, 2007

(86) PCT No.: PCT/JP2007/074573
§ 371 (c)(1),
(2), (4) Date: Jun. 24, 2009

(87) PCT Pub. No.: WO2008/081745
PCT Pub. Date: Jul. 10, 2008

(65) Prior Publication Data
US 2010/0098070 A1    Apr. 22, 2010

(30) Foreign Application Priority Data
Dec. 25, 2006 (JP) ................... 2006-347521

(51) Int. Cl.
*H04L 12/50* (2006.01)
(52) U.S. Cl. ........................................ 370/388
(58) Field of Classification Search .............. None
See application file for complete search history.

(56) References Cited

U.S. PATENT DOCUMENTS

| 4,393,381 A | * | 7/1983 | Seiden | 340/2.24 |
| 5,786,771 A | * | 7/1998 | Feeney et al. | 370/388 |
| 7,301,941 B2 | * | 11/2007 | Dally | 370/374 |
| 2001/0033569 A1 | * | 10/2001 | Dally | 370/369 |

FOREIGN PATENT DOCUMENTS

| JP | 2-36974 B2 | 8/1990 |
| JP | 7-71353 B2 | 7/1995 |

OTHER PUBLICATIONS

Andresen, Steinar, "The Looping Algorithm Extended to Base 2t Rearrangeable Switching Networks," IEEE Transactions on communications, vol. COM-25, No. 10, Oct. 1977, pp. 1057-1063.
Lee, Ching-Yi et al., "A Fast Parallel Algorithm for Routing Unicast Assignments in Benes Neworks," IEEE Transactions on Parallel and Distributed Systems, vol. 6, No. 3, Mar. 1995, pp. 329-334.
International Search Report and Written Opinion of PCT/JP2007/074573, dated Mar. 25, 2008, 11 pages.

\* cited by examiner

*Primary Examiner* — Hassan Phillips
*Assistant Examiner* — Hicham Foud
(74) *Attorney, Agent, or Firm* — Foley & Lardner LLP

(57) ABSTRACT

A multistage switch control circuit allows unit switches to be set at a higher speed than conventional multistage switch control circuits. Higher-order half first and second control elements are connected to a first section of a bus to form a first cluster, while lower-order half third and fourth control elements are connected to a second section of the bus to form a second cluster. A bus switch which functions as a cluster formation means is arranged between the first section and the second section of the bus to perform the connection/separation of the first section and the second section. The first to fourth control elements transmit switch control signals to corresponding unit switches, respectively, in each stage.

6 Claims, 11 Drawing Sheets

*FIG.8*

| | PORT | TIMING | COMPARISON RESULT | BUS NUMBER |
|---|---|---|---|---|
| 131 | 0 | 0 | a | |
| 132 | 0 | 1 | b | |
| 133 | 1 | 0 | c | |
| 134 | 1 | 1 | d | |

MULTISTAGE SWITCH CONTROL CIRCUIT

CROSS-REFERENCE TO RELATED PATENT APPLICATIONS

The present application claims priority as a national stage application of International Application No. PCT/JP2007/074573 filed on Dec. 20, 2007, which claims the benefit of priority to Japanese Application No. 2006-347521, filed Dec. 25, 2006, the entire contents of which are incorporated herein by reference in their entireties.

The present disclosure relates to a multistage switch control circuit and, in particular, to a multistage switch control circuit which sets unit switches for each switch stage for a multistage switch in which a plurality of switch stages having a plurality of unit switches are connected in accordance with a predetermined rule.

As described in Non-patent Document 1, a 2N-input/2N-output Benes network which satisfies $2N=2^n$ (where n is a natural number of 1 or more) is known as a representative multistage switch.

The Benes network conceptually has a structure in which (2n−1) switch stages, each of which is provided with N 2-input/2-output unit switches, are arranged between input ports and output ports. The first switch stage on the input side is referred to as an input switch, while the last switch stage on the output side is referred to as an output switch. The unit switches included in the switch stages between the input switch and the output switch are divided into two intermediate switches which connect between the input switch and the output switch side by side. The switch stages are connected in a shuffled manner according to a predetermined rule. More specifically, one of the output terminals of each of the unit switches constituting the input switch is input to one intermediate switch, while the other output terminals of each of the unit switches is input to the other intermediate switch.

Destination addresses with serial numbers are assigned to the output ports of the Benes network. A Benes network control circuit switches the setting for the unit switches in accordance with destination addresses included in the input information, thereby constructing a route for guiding the input information from the input port to the output port.

The Benes network control circuit sets the unit switches so that two pieces of input information having destination addresses, of which the values with the lowest 1 bit removed become the same for the input information received by the input switch, are input to different intermediate switches. In the second stage and the remaining stages, a similar setting is performed by regarding each intermediate switch as a Benes network. Owing to the characteristics of the Benes network, it is a requirement that the first to the (n−1)th switch stages detect pairing destination addresses and perform the setting for the unit switches, but for the n-th stage and the remaining stages, the setting for the unit switches is determined automatically in accordance with the destination address of each piece of input information. The time required for route setting for the Benes network is therefore dominated by the time required for setting the unit switches constituting the first to the (n−1)th switch stages.

Non-patent Document 1 discloses a method for setting unit switches using software in accordance with the series control method. According to the setting method of Non-patent Document 1, processing is repeated in each switch stage in which a unit switch inputting a destination address that is pairing up with one destination address of a unit switch of which the setting being determined is searched for and selected, and the setting for the unit switch found by the search is performed so that the pairing of the two destination addresses are input to different intermediate switches. According to the setting method of Non-patent Document 1, it is necessary to perform processing for searching for pairing unit switches for N steps in each switch stage, and therefore it requires N×log 2N steps for all the stages.

[Non-Patent Document 1] STEINAR ANDRESEN, "The Looping Algorithm Extended to Base Rearrangeable Switching Networks", IEEE TRANSACTIONS ON COMMUNICATIONS, (USA), October, 1977, Vol. COM-25, No. 10, P. 1057-P. 1063

[Non-Patent Document 2] Ching-Yi Lee and A. Yavuz Oruc, "A Fast Parallel Algorithm for Routing Unicast Assignments in Benes Networks", IEEE TRANSACTIONS ON PARALLEL AND DISTRIBUTED SYSTEMS, (USA), March 1995, Vol. 6, No. 3, P. 329-P. 334

DISCLOSURE

Since the unit switch setting method described in Non-patent Document 1 is a program-controlled method, its processing time is longer than that of a hardware-controlled method. Moreover, since it requires processing time in the order of N×log 2N, its processing time increases to make high-speed switching operations difficult when the switch size increases. In particular, in packet switches and ATM switches, which are regarded as requiring high-speed switching operations, a method capable of processing at higher speed is required.

Non-patent Document 2 discloses a method for performing a method for setting unit switches in accordance with the parallel control method by software. The setting method described in Non-patent Document 2 is performed by a control circuit which connects N control elements corresponding to all the unit switches of each switch stage to each other using N2 wires. More specifically, first, a destination address is transmitted from each control element to all the other control elements in order to form a first-layer link using a plurality of switch groups comprising unit switches having pairing destination addresses. Second, the destination address of a representative node selected from unit switches in each switch group is transmitted to the other unit switches in order to form a second-layer link by linking representative nodes having pairing destination addresses. The process is repeated to form links hierarchically.

Since in the setting method of Non-patent Document 2 searching for pairing unit switches in each layer is performed in parallel, the processing for searching for pairing unit switches is performed for log 2N steps until the settings for all the unit switches in each switch stage are determined. If the unit switches are set in accordance with the parallel control method, the number of steps required for the processing for searching for pairing unit switches can be reduced to a half or less in comparison with the series control method.

However, the parallel control method of Non-patent Document 2 has two problems. First, with an increase in the number of input/output ports, the number of control elements increases in proportion to N, while the number of wires between the control elements increases in proportion to $N^2$, thereby increasing the size of the circuit. Second, the program control has a limit on how much communication time can be reduced and is not suitable for high-speed operation, since destination addresses are required to be transmitted/received between the control elements for each step.

At least one embodiment described herein provides a multistage switch control circuit which can set unit switches faster than conventional multistage switch control circuits.

The first multistage switch control circuit of at least one representative embodiment described herein is a multistage control circuit which, for a multistage switch that arranges a plurality of switch stages having a plurality of unit switches which can switch routes between input and output by setting between a plurality of input ports and a plurality of output ports discriminated by destination address and connects the plurality of switch stages in accordance with a predetermined rule, constructs a transmission route from the input port to the output port in accordance with the destination address designated for each input port by setting the unit switch for each switch stage, comprising a bus, a plurality of control elements, and cluster formation means wherein the bus is connected to all the control elements and each control element comprises transmitting/receiving means for performing transmission/reception of the destination address with respect to another control element through the bus, comparison means for comparing the destination address designated for the unit switch corresponding to oneself with the destination address designated for the unit switch corresponding to another control element, and switch control signal generation means for generating a switch control signal setting the unit switch corresponding to oneself on the basis of the comparison result of the comparison means. The cluster formation means divides the plurality of control elements into a plurality of clusters by defining the range within which the destination address is transmitted/received.

According to the first multistage switch control circuit, parallel processing using the plurality of clusters is achieved, thereby performing settings for unit switches at a higher speed in comparison to conventional multistage switch control circuits.

The second multistage switch control circuit includes the first multistage switch control circuit described above, wherein the cluster formation means has a bus switch for dividing the bus.

The third multistage switch control circuit includes the first multistage switch control circuit described above, wherein the cluster formation means defines the range within which the destination address is transmitted/received by masking the destination address transmitted from another cluster out of the destination addresses received by the cluster.

The fourth multistage switch control circuit includes any one of the first to third multistage switch control circuits described above, wherein the control element further comprises status signal generation means for generating a status signal indicating whether or not a setting for the unit switch corresponding to oneself has been determined.

The fifth multistage switch control circuit includes any one of the first to fourth multistage switch control circuits described above, wherein the multistage switch is a Benes network which has 2N input ports and 2N output ports satisfying $2N=2^n$ (where n is an integer of 2 or more) and arranges $(2n-1)$ 2N-input/2N-output switch stages having N 2-input/2-output unit switches between the input ports and the output ports, and the cluster formation means forms $2k-1$ clusters when the k-th (where k is an integer from 1 to $(2n-1)$) switch stage from the input ports is an object to be controlled.

The sixth multistage switch control circuit includes the fifth multistage switch control circuit described above which determines the presence or absence of a link relationship and the difference in settings between one of the control elements and other of them on the basis of the destination address designated for the unit switch corresponding to the one of the control elements, selects a representative element from a group comprising the control elements having the link relationship on the basis of identification numbers assigned to the control elements, and determines the setting for the unit switch corresponding to the representative element, thereby following the link relationship and determining the setting for another the unit switch, wherein the control elements correspond to different buses, respectively, and each one of the control elements connects the bus corresponding to the other control element having a link relationship with the one of the control elements, transmit the identification numbers to the bus connected thereto, and determine a representative node using wired OR processing.

According to the multistage switch control circuit, parallel processing using the plurality of clusters is achieved, thereby performing settings for unit switches at higher speeds in comparison to conventional multistage switch control circuits.

DESCRIPTION OF REPRESENTATIVE EMBODIMENTS

The multistage switch of the present embodiment comprises an 8-input/8-output Benes network 2, as shown in FIG. 1, and the multistage switch is controlled by a switch control circuit 80, as shown in FIG. 3.

As shown in FIG. 1, the Benes network 2 of the present embodiment comprises first to eighth input ports 3a to 3h, which are arranged in order from the higher order to the lower order, first to eighth output ports 4a to 4h, which are arranged in order from the higher order to the lower order, a plurality of unit switches 10, and a plurality of wires.

The concept of the higher order and the lower order is provided for convenience of description. Hereinafter, when elements having the same structure are described separately, they will be differentiated with ordinal numbers prefixed, but when the general structure or function of elements having the same structure is described, they will be described with ordinal numbers and reference numerals removed.

As shown in FIG. 2, each unit switch 10 has higher-order and lower-order input ports and higher-order and lower-order output ports. The switch setting, in accordance with a switch control signal, switches between a parallel state and a crossed state. When the switch setting becomes the parallel state (0 value), the higher-order input port is connected to the higher-order output port, while the lower-order input port is connected to the lower-order output port. When the switch setting becomes the crossed state (1 value), the higher-order input port is connected to the lower-order output port, while the lower-order input port is connected to the higher-order output port.

In general, the 2N-input/2N-output Benes network satisfying $2N=2^n$ (where n is an integer of 2 or more) comprises the first to the $(2n-1)$th switch stages successively connected from the input side to the output side, in which each switch stage comprises the first to the N-th unit switches arranged in order from the highest first to the lowest N-th.

The first switch stage is referred to as the input switch, while the $(2n-1)$th switch stage is referred to as the output switch. Furthermore, the first to the $(N/2)$th unit switches included in the second to the $(2N-2)$th switch stages construct a higher-order intermediate switch, while the $(N/2+1)$th to the N-th unit switches included in the second to the $(2N-2)$th switch stages construct a lower-order intermediate switch as a whole. There is no wire between the higher-order intermediate switch and the lower-order intermediate switch.

The N higher-order output ports of the N unit switches constituting the first switch stage are connected to the N input ports of the $N/2$ unit switches constituting the higher-order intermediate switch on the second switch stage with the connection order maintained. The N lower-order output ports of the N unit switches constituting the first switch stage are connected to the N input ports of the N/2 unit switches constituting the lower-order intermediate switch on the second switch stage with the connection order maintained.

The N higher-order input ports of the N unit switches constituting the (2n−1)th switch stage are connected to the N output ports of the N/2 unit switches constituting the higher-order intermediate switch on the (2n−2)th switch with the connection order maintained. The N lower-order input ports of the N unit switches constituting the (2n−1)th switch stage are connected to the N output ports of the N/2 unit switches constituting the lower-order intermediate switch on the (2n−2)th switch stage with the connection order maintained.

The higher-order intermediate switch and the lower-order intermediate switch are constructed by a 2M-input/2M-output Benes network satisfying $2M=2^{(n-1)}$ when n>2 and are constructed using one unit switch when n=2, respectively. The connection relationship of the unit switches in the Benes network is thus provided recursively.

Destination addresses are assigned to the output ports of the Benes network. An output port to which each input port is connected is designated by a destination address on each input port, and in accordance with the wiring, the destination address is successively designated for the unit switches on each switch stage in order to switch the unit switches, thereby constructing a transmission route from the input port to the output port.

The Benes network 2 of the present embodiment is, as shown in FIG. 1, constructed as an 8-input/8-output Benes network with n=3, N=4. The plurality of unit switches 10 constructing the Benes network 2 are arranged so that they conceptually form a matrix between the first to eighth input ports 3a to 3h and the first to eighth output ports 4a to 4h. Three-bit binary numbers from 000 to 111 are assigned to the first to eighth output ports 4a to 4h in order.

The plurality of unit switches 10 are arranged so that they are divided into the first to fifth switch stages 5a to 5e, which are arranged side by side from the first to eighth input ports 3a to 3h to the first to eighth output ports 4a to 4h. Each of the first to fifth switch stages 5a to 5e consists of four unit switches 10 arranged from the higher order to the lower order. The unit switches 10 on each switch stage are identified as the first to fourth unit switches in order from the higher order. In particular, the unit switches 10 constituting the first switch stage 5a are referred to as the first to fourth unit switches 11 to 14 in order from the higher order, while the unit switches 10 constituting the second switch stage 5b are referred to as the first to fourth switches 21 to 24 in order from the higher order. The input switch and the output switch are constructed using the first switch stage 5a and the fifth switch stage 5e, respectively. The higher-order intermediate switch 6a is constructed using the two higher-order unit switches 10 selected from each of the second to fourth switch stages 5b to 5d, while the lower-order intermediate switch is constructed using the two lower-order unit switches 10 selected from each of the second to fourth switch stages 5b to 5d.

The switch setting of the unit switches 10 shown in FIG. 1 is one example and this example specifically shows a switch setting when the destination addresses of the input information input from the first to eighth input ports 3a to 3h of the Benes network 2 are 010, 000, 001, 111, 110, 100, 011, and 101, respectively.

Generally, in the Benes network, each unit switch constructing the first to the (n−1)th switch stages is set depending on the destination addresses designated for other unit switches included in the same switch stage, while the unit switch of the n-th and later switch stages can be set independently on the basis of the destination address designated for itself in accordance with predetermined rules. The switch control circuit of the present embodiment switches the setting of each unit switch constructing the first to the (n−1)th switch stages.

The switch control circuit 70 of the first embodiment will now be described.

The switch control circuit 70 switches the switch setting of the unit switches 10 in accordance with the destination addresses designated for the first to eighth input ports 3a to 3h of the Benes network 2 shown in FIG. 1, thereby constructing a transmission route from the input ports to the first to eighth output ports 4a to 4h indicated by the destination addresses. Hereinafter, the destination address designated for the higher-order input port and the lower-order input port of each unit switch will be discriminated as a higher-order destination address and a lower-order destination address.

More specifically, the switch control circuit 70, in accordance with the destination addresses designated for the first to eighth input ports 3a to 3h of the Benes network 2, determines the switch setting of the first to fourth unit switches 11 to 14 constructing the first switch stage 5a on the first stage, and then determines the switch setting of the first to fourth unit switches 21 to 24 constructing the second switch stage 5b on the second stage.

As shown in FIG. 3, the switch control circuit 70 of the present embodiment is provided with first to fourth control elements 71 to 74, a bus 75, 0th to fourth status signal lines 76a to 76e, a bus switch 77, and a timing generation circuit 78.

The timing generation circuit 78 transmits timing information including a clock pulse and time information to the first to fourth control elements 71 to 74 and the bus switch 77, thereby directing the entire operation of the switch control circuit 70.

The bus 75 of the present embodiment has a width allowing a destination address, a response, and a switch setting to be transmitted in parallel. Furthermore, the bus 75 is divided into a higher-order first section 75a and a lower-order second section 75b.

The first to fourth control elements 71 to 74 are conceptually arranged from the higher order to the lower order. The first and second control elements 71 and 72 on the higher-order half are connected to the first section 75a of the bus 75 in order to construct a first cluster, while the third and fourth control elements 73 and 74 on the lower-order half are connected to the second section 75b of the bus 75 in order to construct a second cluster. The first to fourth control elements 71 to 74 have higher-order and lower-order input terminals, respectively.

The first to fourth control elements 71 to 74 are associated with the first to fourth unit switches of switch stages, which are objects to be controlled on each stage, respectively. The higher-order and lower-order destination addresses of each unit switch are received by the higher-order and lower-order input terminals of each corresponding control element on the first stage, in which the first switch stage 5a is an object to be controlled, and are received through the bus 75 on the second stage, in which the second switch stage 5b is an object to be controlled. The first to fourth control elements 71 to 74 transmit a switch control signal to the corresponding unit switch, respectively, on each stage.

The 0th to fourth status signal lines 76a to 76e transmit 0th to fourth status signals, respectively, indicating whether all the higher-order control elements are processed (1 value) or an unprocessed control element is included (0 value) from a higher-order control element to a lower-order control element. The 0th status signal line 76*a* transmits the 0th status signal to the first control element 71. The 0th status signal is always set so as to indicate "processed" (1 value) by the timing generation circuit 78. The first to third signal lines 76*b* to 76*d* transmit the first to third status signals generated by the first to third control elements 71 to 73 to the second to fourth control elements 72 to 74. The fourth status signal line 76*e* transmits the fourth status signal generated by the fourth control element 74 to the timing generation circuit 78. All the first to fourth status signals are set so as to indicate "unprocessed" (0 value) in the initial state. After the settings of all the unit switches of a switch stage to be controlled have been completed, the fourth status signal switches so as to indicate "processed".

The on/off type bus switch 77 is arranged between the first section 75*a* and the second section 75*b* of the bus 75 in order to perform the connection/separation of the first section 75*a* and the second section 75*b*, and is arranged in the third status signal line 76*c* connecting the first cluster and the second cluster in order to perform the connection/separation of the third status signal line 76*c*. The bus switch 77 functions as a cluster formation means for separating the first cluster and the second cluster from each other.

FIG. 4 is a block diagram showing the first control element 71. Since the second to fourth control elements 72 to 74 have the same configuration as the first control element 71, only differences from the first control element 71 will be described.

The first control element 71 is provided with higher-order and lower-order destination storage sections 90*a* and 90*b*, a selector 91, first to third comparison circuits 93*a* to 93*c*, a flag signal hold circuit 94, a switch control signal generation circuit 95, a flag setting circuit 96, and a status signal generation circuit 97.

The higher-order and lower-order destination storage sections 90*a* and 90*b* receive the higher-order and lower-order destination addresses of the corresponding unit switch from the higher-order and lower-order input terminals or the bus 75 and store them. In the first stage, the destination address with the lower-order 1-bit removed from the perfect destination address is stored.

The selector 91 transmits the destination address stored in the higher-order destination storage section 90*a* and the destination address stored in the lower-order destination storage section 90*b* to the bus 75 successively. Only one of the higher-order and lower-order destination addresses stored by the first to fourth control elements 71 to 74 is transmitted to the bus 75 at a time.

The first comparison circuit 93*a* receives a destination address transmitted from the other control element to the bus 75 and compares the higher-order destination address stored in the higher-order destination storage section 90*a* to the received destination address. The second comparison circuit 93*b* receives a destination address transmitted from the other control element to the bus 75 and compares the lower-order destination address stored in the lower-order destination storage section 90*b* to the received destination address. The third comparison circuit 93*c* compares the higher-order destination address stored in the higher-order destination storage section 90*a* to the lower-order destination address stored in the lower-order destination storage section 90*b* in each control element.

The switch control signal generation circuit 95 controls the operation of each control element in order to generate a switch control signal on the basis of the comparison results of the first to third comparison circuits 93*a* to 93*c*, the setting value of the flag signal hold circuit 94, the setting value of a status signal, and various kinds of signals received from the bus 75.

The flag signal hold circuit 94 stores a flag indicating the processing condition of the corresponding control element. The flag set so as to indicate "unprocessed" (0 value) in the initial state is appropriately switched so as to indicate "processed" (1 value) by the switch control signal generation circuit 95 or the flag setting circuit 96.

The flag setting circuit 96 rewrites the flag of the flag signal hold circuit 94 so as to indicate "processed" (1 value) when at least either one of the comparison results of the first comparison circuit 93*a* and the second comparison circuit 93*b* reached agreement. In other words, in each control element, if a destination address pairing up with at least either one of the higher-order and lower-order destination addresses stored therein is stored in the other control element, it is regarded that there is a link, thereby allowing the flag to be rewritten so as to indicate "processed" (1 value).

The status signal generation circuit 97 transmits the information of "processed" (1 value) to the next-stage control element only when the received status signal is set so as to indicate. "processed" (1 value) and when the flag of the corresponding flag signal hold circuit 94 is set so as to indicate "processed" (1 value).

The operation of the switch control circuit 70 will now be described. The operation of the switch control circuit 70 is controlled in accordance with the timing information transmitted from the timing generation circuit 78.

In the first stage, the first switch stage 5*a*, as shown in FIG. 1, is an object to be controlled, and the first to fourth control elements 71 to 74 are associated with the first to fourth unit switches 11 to 14 of the first switch stage 5*a*, respectively.

The first stage comprises first to third phases.

In the first phase, the initial setting operation is performed. More specifically, first, the higher-order and lower-order destination storage sections 90*a* and 90*b* of the first to fourth control elements 71 to 74 receive the higher-order and lower-order destination addresses of the corresponding first to fourth unit switches 11 to 14 through the higher-order and lower-order input terminals, and store the remaining bits of the received destination addresses with the lowest 1 bit removed. Since the original destination address of the present embodiment consists of three bits, the higher-order two bits of the original destination address are stored. In the first stage, the destination addresses are input from the higher-order and lower-order input terminals.

In the second stage and later, the higher-order and lower-order destination storage sections 90*a* and 90*b* of each control element receive the higher-order and lower-order destination addresses of the corresponding unit switch through the bus.

Next, the switch control signal generation circuit 95 of each control element examines whether both the higher-order and lower-order destination addresses stored in the corresponding one are invalid destination addresses with no connection destination. Since the control element of which both the stored higher-order and lower-order destination addresses are invalid is not linked with other control elements, the setting of the corresponding unit switch may be set to be in any one of the parallel state and the crossed state. In the present embodiment the switch control signal is transmitted so that it is set to be in the parallel state, and the content of the flag signal hold circuit 94 within the same control element is set so as to indicate "processed" (1 value).

Next, the switch control signal generation circuit 95 of each control element, when at least either one of the higher-order and lower-order destination addresses stored in the corresponding one is valid, examines the comparison result of the third comparison circuit 93c. When the comparison result of the third comparison circuit 93c shows agreement between the higher-order and lower-order destination addresses stored in the corresponding one, the control element is not linked with other control elements, and the setting of the corresponding unit switch can be in any one of the parallel state and the crossed state. In the present embodiment the switch control signal is transmitted so that it is set to be in the parallel state, and the content of the flag signal hold circuit 94 within the same control element is set so as to indicate "processed" (1 value).

The unit switch corresponding to the first control element 71 is subjected to switch setting in the selected switch stage first, and may be in the parallel state or in the crossed state. In the present embodiment it is set to be in the parallel state.

In the example shown in FIG. 1, since all the destination addresses of the input information input to the first switch stage 5a are valid, and none of the higher-order destination addresses and the lower-order destination addresses stored in each control element match each other, in the first phase only the switch setting of the first unit switch 11 corresponding to the first control element 71 is determined to be in the parallel state in accordance with the initial setting.

A second phase comprises the first to third sub-phases.

In the first sub-phase, it is determined which control element transmits the destination address stored therein to the bus 75. More specifically, the control element of which the received status signal is set so as to indicate "processed" (1 value) is selected as a control element which transmits the destination address. Initially, since only the 0th status signal is set so as to indicate "processed" (1 value), the first control element 71 is selected as the control element which transmits the destination address to the bus 75, and the content of the flag signal hold circuit 94 of the first control element 71 is set so as to indicate "processed" (1 value).

In the second sub-phase, the control element selected in the first sub-phase transmits the destination address stored in the higher-order destination storage section 90a and the destination address stored in the lower-order destination storage section 90b through the selector 91 to the bus 75 in order, and transmits the setting for the corresponding unit switch. Whether the destination address on the bus 75 is the higher-order destination address or the lower-order destination address is discriminated by the timing transmitted. The other control elements not selected in the first sub-phase compare the destination address on the bus 75 with the destination address stored therein using the first comparison circuit 93a and the second comparison circuit 93b.

In the third sub-phase, the control element not selected in the first sub-phase, when either one of the two destination addresses transmitted to the bus 75 matches the destination address stored therein, responds through the bus 75, and sets the flag signal hold circuit 94 so as to indicate "processed" (1 value). However, when the flag signal hold circuit 94 is already set so as to indicate "processed" (1), or when the other destination address stored therein is invalid, it does not respond. When both the two destination addresses received from the bus 75 do not match the destination address stored therein, it does not respond.

The switch control signal generation circuit 95 of each control element, when the destination address stored in the corresponding one matches the higher-order destination address of the control element as the transmission source, or when the lower-order destination address stored in the corresponding one matches the lower-order destination address of the control element as the transmission source, the corresponding switch control signal is generated so that it differs from the switch setting for the control element as the transmission source. Meanwhile, when the higher-order destination address stored in the corresponding one matches the lower-order destination address of the control element as the transmission source, or when the higher-order destination address stored in the corresponding one matches the lower-order destination address of the control element as the transmission source, the switch control signal is generated so that its switch setting becomes the same as that of the control element as the transmission source.

In other words, two pieces of input information in which the higher-order 2-bits match each other and the lower-order 1-bit differ from each other out of the input information input to the first switch stage 5a are transmitted to the higher-order intermediate switch 6a and the lower-order intermediate switch 6b of the second switch stage 5b separately.

The control element which has responded then becomes a control element for transmitting the destination address, and repeats the second sub-phase and the third sub-phase. When there is no control element which responds, the higher-order control element in which the flag signal hold circuit 94 indicates "unprocessed" (0 value), i.e., the control element of which the receiving status signal indicates "processed" (1 value) and the first flag signal hold circuit 94 is set so as to indicate "unprocessed" (0 value) is selected as a control element which transmits the destination address next time. When the flag signal hold circuit 94 of all the control elements is set so as to indicate "processed" (1 value), and there is no more destination addresses to be transmitted to the bus 75, all the first to fourth control elements 71 to 74 have set the switch settings for the corresponding unit switches, ending the second phase.

With reference to FIG. 1 and FIG. 4, the operation of the switch control circuit 70 on the input example shown in FIG. 1 will now be described. First, the first unit switch 11 shown in FIG. 1 is set to be in the parallel state, and the higher-order destination address (01) of the first control element 71 shown in FIG. 4 is transmitted to the bus 75. Since the higher-order destination address (01) of the first control element 71 matches the higher-order destination address (01) of the fourth control element 74, the fourth unit switch 14 shown in FIG. 1 is set to be in the crossed state, and the lower-order destination address (10) of the fourth control element 74 shown in FIG. 4 is transmitted to the bus 75. Since the destination address (10) of the fourth control element 74 matches the lower-order destination address (10) of the third control element 73, the third unit switch 13 shown in FIG. 1 is set to be in the parallel state, and the higher-order destination address (11) of the third control element 73 in FIG. 4 is transmitted to the bus 75. Since the destination address (11) of the third control element 73 matches the lower-order destination address (11) of the second control element 72, the second unit switch 12 shown in FIG. 1 is set to be in the parallel state. In this stage the flag signal hold circuit 94 of all the control elements is set so as to indicate "processed" (1 value), ending the processing for the first switch stage 5a.

In the third phase, in accordance with the settings for the unit switches in the first phase and the second phase, the destination addresses stored in the first to fourth control elements 71 to 74 are transferred in a time division manner through the bus 75 to be replaced. The destination addresses stored in the first to fourth control elements 71 to 74 are transferred in a time division manner through the bus 75, thereby allowing the higher-order and lower-order destination addresses of the first to fourth unit switches 21 to 24 of the second switch stage 5b to be stored in the higher-order and lower-order destination storage section 90a of the corresponding first to fourth control elements 71 to 74.

Next, the process moves on to the second stage, in which the second switch stage 5b is to be controlled. In the second stage, the bus switch 77 is set to be in the off state, thereby separating the first section 75a and the second section 75b of the bus 75 and cutting off the status signal between the first cluster and the second cluster. The control element constituting the first cluster corresponds to the unit switches constituting the higher-order intermediate switch 6a of the second switch stage 5b, while the control element constituting the second cluster corresponds to the unit switches constituting the lower-order intermediate switch 6b of the second switch stage 5b.

The processing of the first to third phases in the second stage is the same as the first stage except that the switch stages to be controlled are different. In the second stage only the higher-order 1-bit of each of the destination addresses is compared with each other, with the lower order 2-bits thereof removed by masking the lower-order 1-bit of the bus 75 to be a 0 value or a 1 value. Since the bus 75 is divided, the processing of the first to third phases in the first duster and the processing of the first to third phases in the second cluster can be performed in parallel.

When controlling a 2N-input/2N-output Benes network, in the third stage and later, each cluster may be divided into a higher-order cluster and a lower-order duster by the bus switch 77, similar processing may be performed for each duster, and similar operations may be repeated for each duster.

As described above, by dividing control elements into a plurality of clusters in order to perform parallel processing every time the switch stage to be controlled is shifted, the number of processing steps for the switch setting for the 2N-input/2N-output Benes network can be N+N/2+N/4+N/8+ . . . +1=(2N−1). The present embodiment can therefore substantially reduce the number of processing steps, which, in the case that included no division into clusters, required N×log 2N steps.

The switch control circuit in the present embodiment is provided with control elements corresponding to one switch stage only and replaces the destination addresses between the control elements after the setting for each switch stage ends. Another embodiment may be provided with a plurality of control element groups corresponding to a plurality of switch stages, and one group may transmit destination addresses to the next group through a wire similar to the Benes network every time the setting for each switch stage by control elements in each group ends.

A switch control circuit 100 in the second embodiment will now be described.

As shown in FIG. 5, the switch control circuit 100 in the second embodiment is provided with first to fourth control elements 101 to 104, first to fourth buses 105a to 105d, and a timing generation circuit 106.

The timing generation circuit 106 provides instructions for the entire operation stages of the switch control circuit 100 by transmitting timing information which includes dock pulse and time information to the first to fourth control elements 101 to 104. In order to clarify FIG. 5, signal lines from the timing generation circuit 106 to other elements are omitted.

Numbers 1 to 4 are assigned to the first to fourth buses 105a to 105d in the present embodiment. Each bus has sufficient width for transmitting a destination address, a response, and a switch setting in parallel. Furthermore, since the first to fourth buses 105a to 105d are buses able to perform wired OR processing, transmission with a 0 value and a 1 value mixed will be masked to a 1 value.

The first to fourth control elements 101 to 104 are conceptually arranged from the higher order to the lower order successively and are provided with higher-order and lower-order input terminals, respectively. The first to fourth control elements 71 to 74 correspond to the first to fourth unit switches in each switch stage, respectively, and receive the higher-order and lower-order destination addresses of the corresponding unit switch by the higher-order and lower-order input terminals in the first stage. They receive them through the bus in the second stage, and transmit the switch control signal to the corresponding unit switch in the last phase of each stage. Furthermore, the first to fourth control elements 101 to 104 correspond to the first to fourth buses 105a to 105d, respectively.

FIG. 6 is a block diagram showing the first control element 101. Since the second to fourth control elements 102 to 104 have the same configuration as the first control element 101, only points of difference from the first control element 101 will be described.

The first control element 101 is provided with a link search section 110, a link setting section 111, a connection section 112, a representative switch determination section 113, and an initial-value generation circuit 114.

The link search section 110 shown in FIG. 7 mainly performs processing of the acquisition of destination addresses and search data extraction, and also performs switch search processing. As shown in the block diagram in FIG. 7, the link search section 110 is provided with higher-order and lower-order destination storage sections 120a and 120b, a selector 121, first to seventh comparison circuits 122a to 122g, first and second priority encoders 123a and 123b, and a search result storage section 124.

The higher-order and lower-order destination storage sections 120a and 120b receive destination addresses from the higher-order and lower-order input terminals or from the first to fourth buses 105a to 105d and store them. What the higher-order and lower-order destination storage sections 120a and 120b receive in each stage are the higher-order and lower-order destination addresses of the corresponding unit switches, respectively. In the first stage destination addresses with the lower-order 1-bit removed from the destination address that is actually input to each unit switch is stored.

The selector 121 successively transmits the destination address stored in the higher-order destination storage section 120a and the destination address stored in the lower-order destination storage section 120b to the bus corresponding to the corresponding control element. More specifically, the selector 121 of the first to fourth control elements 101 to 104 simultaneously transmits the destination address stored in the higher-order destination storage section 120a to the first to fourth buses 105a to 105d, respectively, at the first timing, and transmits the destination address stored in the lower-order destination storage section 120b at the second timing.

The first comparison circuit 122a compares the destination address stored in the higher-order destination storage section 120a with the destination address stored in the lower-order destination storage section 120b within each control element. The second to fourth comparison circuits 122b to 122d compare the destination addresses received from the three buses corresponding to the other control elements with the higher-order destination address of the corresponding control element, respectively. The fifth to seventh comparison circuits 122e to 122g compare the destination addresses received from the three buses corresponding to the other control elements with the lower-order destination address of the corresponding control element, respectively.

The second to fourth comparison circuits 122b to 122d and the fifth to seventh comparison circuits 122e to 122g function as receiving means for receiving destination addresses from the other control elements in the first stage, and function as cluster formation means for masking the destination addresses transmitted from the control elements of another cluster in the second stage.

The first and second priority encoders 123a and 123b have four input terminals to which numbers are assigned, respectively, and output the number of the input terminal at which input occurs. More specifically, the first priority encoder 123a receives the comparison results of the second to fourth comparison circuits 122b to 122d from its three input terminals. The numbers of the input terminals to which the second to fourth comparison circuits 122b to 122d are connected match the number of the bus which is connected to one input of the second to fourth comparison circuits 122b to 122d. The number of the remaining one input terminal matches the number of the bus corresponding to the control element thereof, and is fixed to be in an input-less idle state.

The outputs of the first and second priority encoders 123a and 123b are stored in the search result storage section 124 as first to fourth search results 131 to 134 together with attached information, as shown in FIG. 8. The first to fourth search results 131 to 134 comprise information of port, timing, comparison results, and a bus number.

The value of the port is set to be a 0 value if one destination address compared is the higher-order destination address of the corresponding control element, and is set to be a 1 value if it is the lower-order destination address thereof. The value of the timing is set to be a 0 value if the other destination address compared to is the higher-order destination address of another control element, and is set to be a 1 value if it is the lower-order destination address thereof. The bus number represents a number assigned to a bas which has transmitted a destination address when the comparison result matches.

The comparison result is set to either a 1 value representing a match or a 0 value representing a mismatch. More specifically, the comparison result of the first search result 131 is set to be a 1 value when either one of the higher-order destination addresses of the other control elements matches the higher-order destination address of the control element thereof at the first timing. The comparison result of the second search result 132 is set to be a 1 value when either one of the lower-order destination addresses of the other control elements matches the higher-order destination address of the control element thereof at the second timing. The comparison result of the third search result 133 is set to be a 1 value when either one of the higher-order destination addresses of the other control elements matches the lower-order destination address of the control element thereof at the first timing. The comparison result of the fourth search result 134 is set to be a 1 value when either one of the lower-order destination addresses of the other control elements matches the lower-order destination address of the control element thereof at the second timing.

The link setting section 111 shown in FIG. 9 performs link setting processing. More specifically, the link setting section 111 compares the first search result 131 with the second search result 132 in order to generate a first output signal group 141, and compares the second search result 132 with the fourth search result 134 in order to generate a second output signal group 142. The first output signal group 141 includes the first to third output signals 143a to 143c. The second output signal group 142 includes the fourth to sixth output signals 143d to 143f.

The first output signal 143a indicates whether a link destination matching the higher-order destination address stored in the corresponding one exists (1 value) or does not exist (0 value). The second output signal 143b indicates, when the first output signal 143a is set so as to indicate "link exists," whether the settings for the two unit switches linked are "opposite" (0 value) or "same" (1 value). When both the pairing destination addresses are higher-order destination addresses or lower-order destination addresses, the value of the second output signal 143b is set so as to indicate "opposite" (0 value). When one of the pairing destination addresses is a higher-order destination address and the other destination address is a lower-order destination address, the value of the second output signal 143b is set so as to indicate "same" (1 value). The third output signal 143c indicates a bus number corresponding to the control element of the link destination.

The fourth output signal 143d indicates whether a link destination matching the lower-order destination address stored in the corresponding one exists (1 value) or does not exist (0 value). The fifth output signal 143e indicates, when the fourth output signal 143d is set so as to indicate "link exists," whether the settings for the two unit switches linked are "opposite" (0 value) or "same" (1 value). When both the pairing destination addresses are higher-order destination addresses or lower-order destination addresses, the value of the fifth output signal 143e is set so as to indicate "opposite" (0 value). When one of the pairing destination addresses is a higher-order destination address and the other destination address is a lower-order destination address, the value of the fifth output signal 143e is set so as to indicate "same" (1 value). The sixth output signal 143f indicates a bus number corresponding to the control element of the link destination.

The first output signal 143a of the first output signal group 141 is set so as to indicate "link exists" (1 value) only when at least either one of the two comparison results of the first search result 131 and the third search result 133 represents "a match" (1 value). The second output signal 143b is set so as to indicate "opposite" (1 value) if the comparison result of the first search result 131 represents "a match" (1 value), and is set so as to indicate "same" (0 value) if the comparison result of the third search result 133 represents "a match" (1 value). The third output signal 143c is set to be a bus number corresponding to either one of the first search result 131 or the third search result 133 having a comparison result representing "a match" (1 value).

The fourth output signal 143d of the second output signal group 142 is set so as to indicate "link exists" (1 value) only when at least either one of the two comparison results of the second search result 132 and the fourth search result 134 represents "a match" (1 value). The fifth output signal 143e is set so as to indicate "same" (0 value) if the comparison result of the second search result 132 represents "a match" (1 value), and is set so as to indicate "opposite" (1 value) if the comparison result of the fourth search result 134 represents "a match" (1 value). The sixth output signal 143f is set to be a bus number corresponding to either one of the second search result 132 or the fourth search result 134 having a comparison result representing "a match" (1 value).

As shown in FIG. 10, the connection section 112 switches the connection between the first to fourth buses 105a to 105d and the representative switch determination section 113 and between the first to fourth buses 105a to 105d and the initial-value generation circuit 114. Furthermore, the connection section 112 inserts a NOT circuit into the bus as needed.

The representative switch determination section 113 performs representative switch determination processing for determining one control element as a representative switch from a group consisting of a plurality of linked control elements. When a plurality of groups consisting of linked control elements exists, a control element is determined for each group using parallel processing. When determining the representative switch, in accordance with the first and second output signal groups 141 and 142 transmitted from the link setting section 111, the two buses corresponding to the linked control elements are short-circuited, and the representative switch determination section 113 is connected to the short-circuited buses.

The representative switch determination section 113 is provided with a resister 150, a multiplexer 151, an output buffer 152, an input buffer 153, an XOR circuit 154, and a set-reset (SR) flip-flop 155. The resister 150 stores difference numbers for each control element. The multiplexer 151 outputs the bus number stored in the resister 150 by each 1-bit from higher-order to the short-circuited buses through the output buffer 152. Since the first to fourth buses 105a to 105d are the buses allowed to perform wired OR processing, when a 0 value and a 1 value are transmitted from a plurality of control elements in a mixed manner, they are masked to be a 1 value. The input buffer 153 receives the value on the short-circuited buses. The XOR circuit 154 detects whether the value transmitted to the bus and the value received from the bus match each other. The SR flip-flop 155 allows the output buffer 152 to output a value only while the transmitted value and the received value match each other, and when the transmitted value and the received value become different from each other, it is switched to a set state and makes the output of the output buffer 152 either tri-state or fixes it to be a 0 value in order to stop transmission In the end, the SR flip-flop 155 of the control element with the maximum identification number stored in the resister 150 is not set until the end, and this control element is determined to be a representative switch. The control element with the minimum identification number may be a representative switch by reversing the output from the output buffer 152 to the bus.

The connection section 112 shown in FIG. 11 performs switch setting processing. More specifically, the connection section 112 refers to the first and second output signal groups 141 and 142 transmitted from the link setting section 111 when the representative switch determination processing is performed. It then short-circuits the two buses corresponding to the linked control elements, and connects the representative switch determination section 113 to the short-circuited buses. After the representative switch is determined, the connection section 112 separates the buses short-circuited in the control element determined to be the representative switch, and connects the initial-value generation circuit 114 to one of the separated buses. Further to this, the connection section 112 inserts a NOT circuit into the bus corresponding to the control element of which the setting for the corresponding unit switch is opposite. The connection section 112 functions as a switch setting signal generation means, and a final output is transmitted to the corresponding unit switch as a switch setting signal.

The initial-value generation circuit 114 is connected to the bus only when the control element thereof is determined to be a representative switch, and transmits the parallel state (0 value) or the crossed state (1 value) as an initial value to the output terminal of the representative switch and the bus. In the present embodiment the initial value is set to be in the crossed state (1 value).

The operation of the switch control circuit 100 will now be described. The operation of the switch control circuit 100 is controlled in accordance with the timing information transmitted from the timing generation circuit 78.

In the first stage, the first switch stage 5a shown in FIG. 1 is an object to be controlled. The first to fourth control elements 101 to 104 shown in FIG. 5 correspond to the first to fourth unit switches 11 to 14 of the first switch stage 5a shown in FIG. 1, respectively.

The first stage further comprises first to fifth phases.

In the first phase, processing for the acquisition of destination addresses and search data extraction is performed. More specifically, the higher-order and lower-order destination storage sections 120a and 120b of the first to fourth control elements 101 to 104 shown in FIG. 7 receive the higher-order and lower-order destination addresses of the first to fourth unit switches 11 to 14 of the first switch stage 5a shown in FIG. 1, respectively, and store the remaining bits of the received destination address with the lowest 1-bit removed. In the present embodiment the higher-order 2 bits of the received 3-bit destination addresses are stored. In the first stage, the destination addresses are input from the higher-order and lower-order input terminals.

In the second phase, switch search processing is performed to search whether destination addresses pairing up with the higher-order and lower order destination addresses stored in each control element are included in the higher-order and lower-order destination addresses stored in another control element. Pairing destination addresses in the first stage are the ones in which the stored destination addresses match each other.

More specifically, each control element compares the higher-order destination address with the lower-order destination address stored therein, and when they match each other, the setting for the unit switch may be either because the control element is not linked with another control element, but in the present embodiment the setting in the initial-value generation circuit 114 is directly output as a switch control signal.

Next, when the higher-order destination address and the lower-order destination address stored therein do not match each other, the selector 121 of the first to fourth control elements 101 to 104 simultaneously transmits the higher-order destination address to the corresponding bus at the first timing, and then at the second timing, simultaneously transmits the lower-order destination address. The first and second priority encoders 123a and 123b of each control element create the first to fourth search results 131 to 134 shown in FIG. 8 on the basis of the comparison results of the second to seventh comparison circuits 122b to 122g.

In the third phase, link setting processing is performed to clarify the link relationship between the control elements. More specifically, the link setting section 111 shown in FIG. 9 creates first and second output signal groups in accordance with the first to fourth search results 131 to 134. In other words, for each control element, information is obtained on whether a link exists or not, whether, when a link exists, the settings for the unit switches corresponding to the linked control elements are the same or opposite, and what the bus number corresponding to the linked control elements is. A maximum of two links is created from one control element.

As described above, all the link relationships between the control elements, in other words, all the link relationships between unit switches, become clear using one time search processing from the first phase to the third phase.

In the fourth phase, representative switch determination processing is performed by the representative switch determination section 113 in order to determine a representative switch. In the present embodiment the identification number stored in the resister 150 of the representative switch determination section 113 shown in FIG. 10 is set so that the fourth control element 104 becomes the largest, and the fourth control element 104 is determined to be the representative switch.

In the fifth phase, switch setting processing is performed. In accordance with the first and second output signal groups 141 and 142 transmitted from the link setting section 111, in the control elements other than the control element determined to be the representative switch, the two buses corresponding to the linked control elements are short-circuited, and a NOT circuit is inserted between the linked control elements so that the settings for the unit switches are opposite. In the control element determined to be the representative switch, the initial-value generation circuit 114 is connected to one of the buses corresponding to the linked control elements. Finally, the first to fourth control elements 101 to 104 output the switch control signals to the corresponding first to fourth unit switches 11 to 14.

In the example of the present embodiment the connection of the bus within the fourth control element 104 determined to be the representative switch is released, and the initial-value generation circuit 114 is connected to the output terminal. Furthermore, since the settings for the unit switches of the fourth control element 104 and the third control element 103 are opposite, the connection section 112 of the fourth control element 104 inserts a NOT circuit between the fourth bus corresponding to the first control element 101 and the output terminal thereof. Since the fourth control element 104 and the first control element 101 also have opposite unit switch settings, the connection section 112 of the first control element 101 inserts a NOT circuit between the first bus corresponding to the fourth control element 104 and the output terminal thereof. The control elements having the same unit switch setting are connected with each other in a short-circuited manner. Finally, the first to fourth unit switches 11 to 14 are set to be in the parallel state, the parallel state, the parallel state, and the crossed state, respectively, and the first stage ends.

Next, the process moves on to the second stage, in which the second switch stage 5b is an object to be controlled. In the second stage, the first to fourth control elements 101 to 104 correspond to the first to fourth unit switches 21 to 24 of the second switch stage 5b, respectively, and processing similar to the first stage is performed. In the second stage, the destination addresses stored in the higher-order and lower-order destination storage sections 120a and 120b are replaced through the first to fourth buses 105a to 105d.

In the second stage, the signals transmitted from the third and fourth buses 105c and 105d to the first and second control elements 101 and 102 are masked to be a 0 value or a 1 value, while the signals transmitted from the first and second buses 105a and 105b to the third and fourth control elements 103 and 104 are masked to be a 0 value or a 1 value. By masking the signals, the processing of the first cluster comprising the first and second control elements 101 and 102 and the processing of the second cluster comprising the third and fourth control elements 103 and 104 can be performed in parallel separately.

The processing within the first cluster and the second cluster is the same as the entire processing in the first stage except that the switch stages to be controlled are different. In the second stage, since the lower-order 1-bit of the first to fourth buses 105a to 105d is masked to be a 0 value or a 1 value, only the higher-order 1-bit of the original destination addresses with the lower-order 2-bits removed is compared with other one.

As described above, by providing a plurality of buses of the same number as the unit switches, it is possible to determine the switch settings for the entire unit switches constituting each switch stage with only one step by parallel processing and this can speed up processing in comparison to the log 2N number of steps required conventionally.

Connecting the control elements with buses can reduce the number of wires to N in the present embodiment, down from N2 required in a conventional ease where the control elements are connected with each other in a mesh manner.

Since the representative switch determination processing uses a bus that is allowed to perform wired OR processing, the transmission/reception of destination addresses between the control elements can be of the one time only and this can speed up the representative switch determination processing in comparison to conventional techniques in which destination addresses are transmitted/received a plurality of times between control elements.

According to the present embodiment, since, when the second switch stage 5b and later switch stages are an object to be controlled, the control elements are divided into a plurality of dusters wherein they have no link relationship with each other, and the control element of each duster masks a signal from a bus corresponding to the control element of another duster, the switch settings for the unit switches corresponding to the plurality of clusters can be processed with one step only, similarly to those of the first switch stage.

Although the representative embodiments have been described in detail herein, it should be appreciated that the description should not limit the present invention is to these embodiments, and can be performed in a variety of manners.

BRIEF DESCRIPTION OF THE DRAWINGS

FIG. 8 is a chart indicating a search result stored in the search result storage section shown in FIG. 7.

Figure 1:
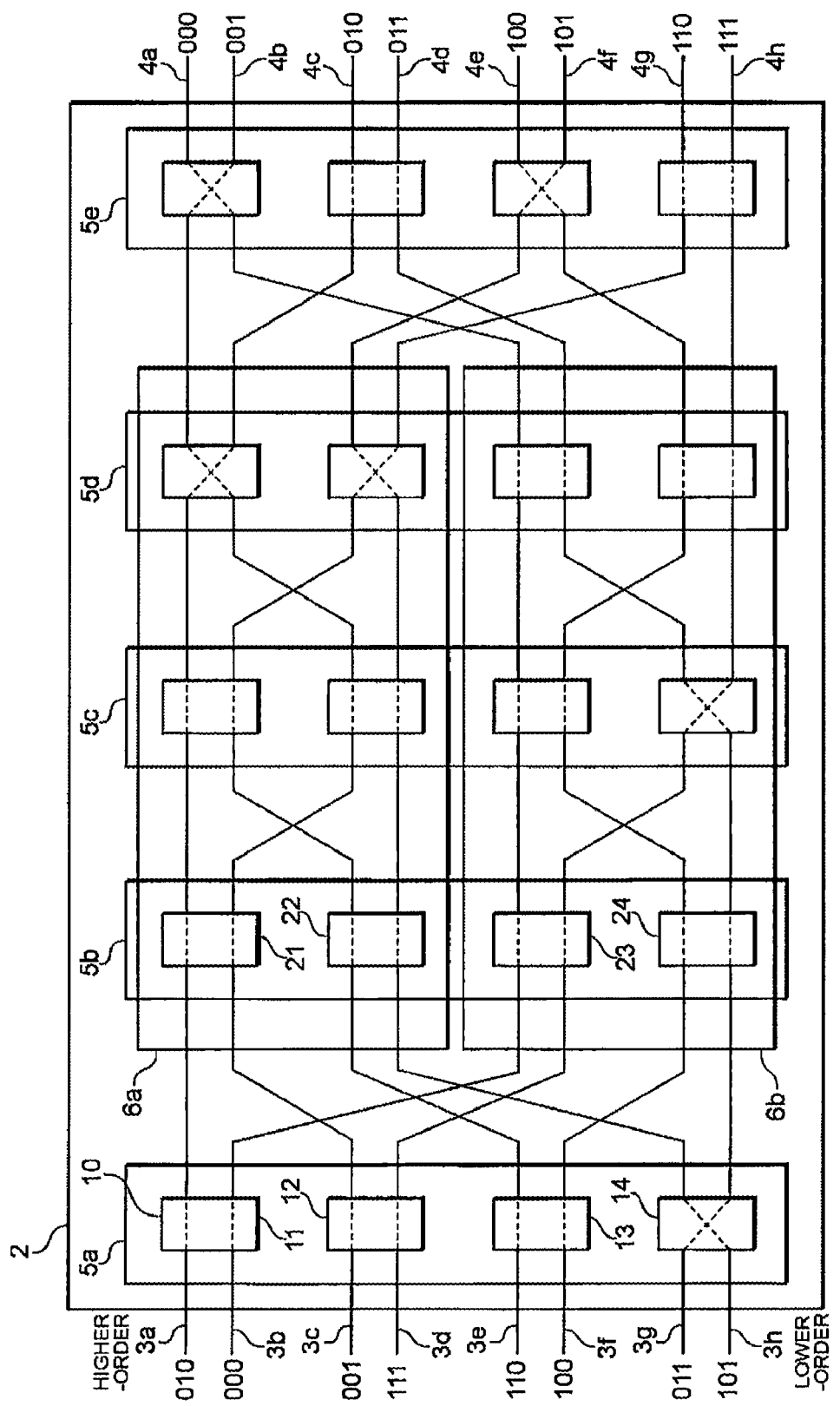
FIG. 1 is a block diagram of a Benes network.
Figure 2:
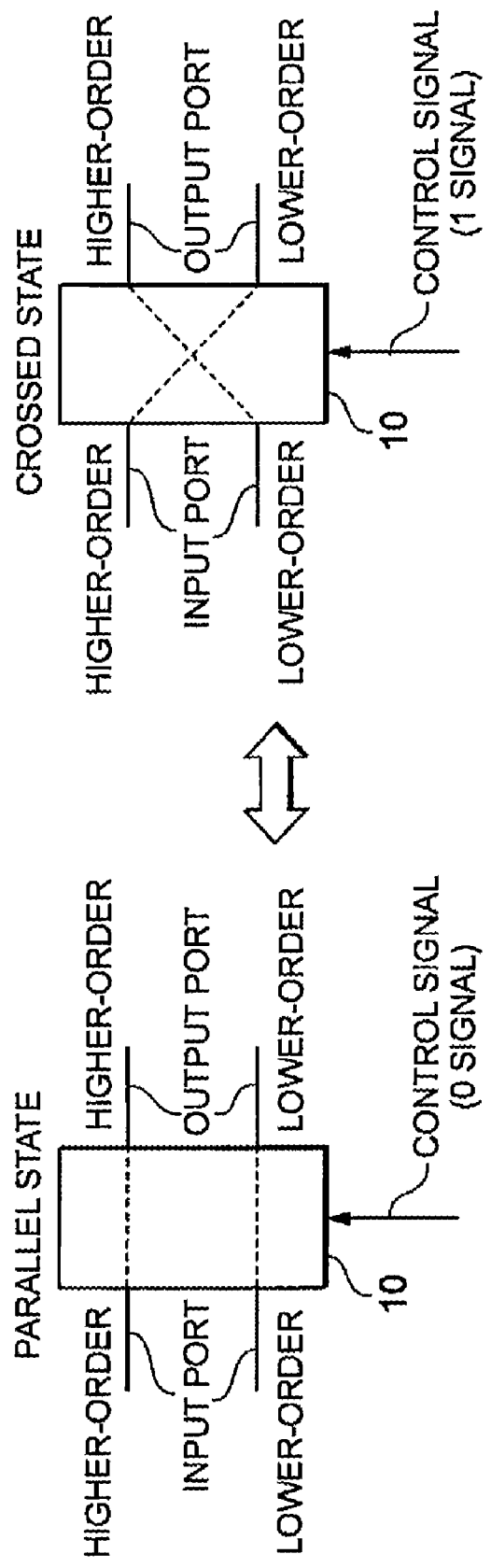
FIG. 2 is a block diagram of the unit switches shown in FIG. 1 in a parallel state and in a crossed state.
Figure 3:
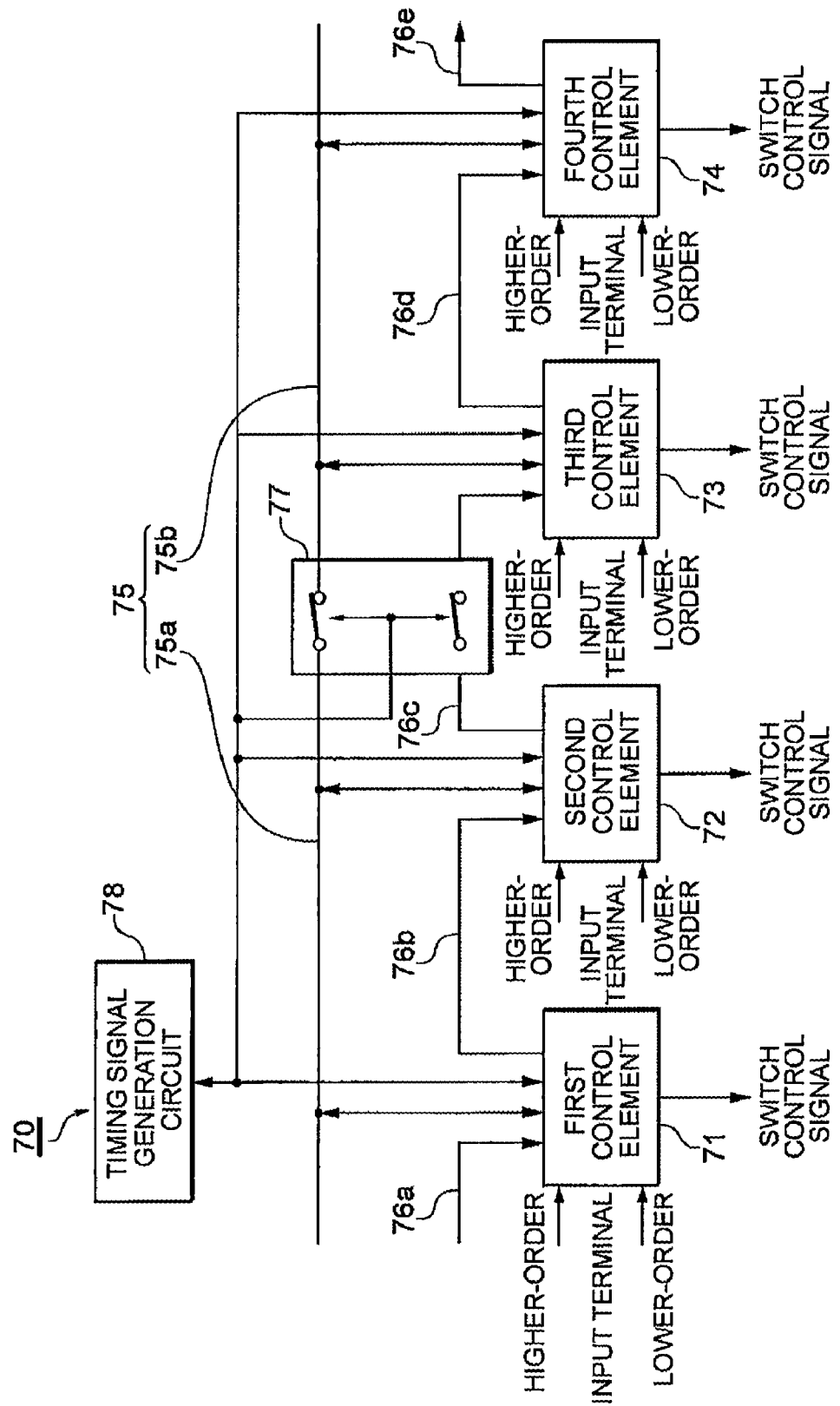
FIG. 3 is a block diagram of a switch control circuit in accordance with one embodiment.
Figure 4:
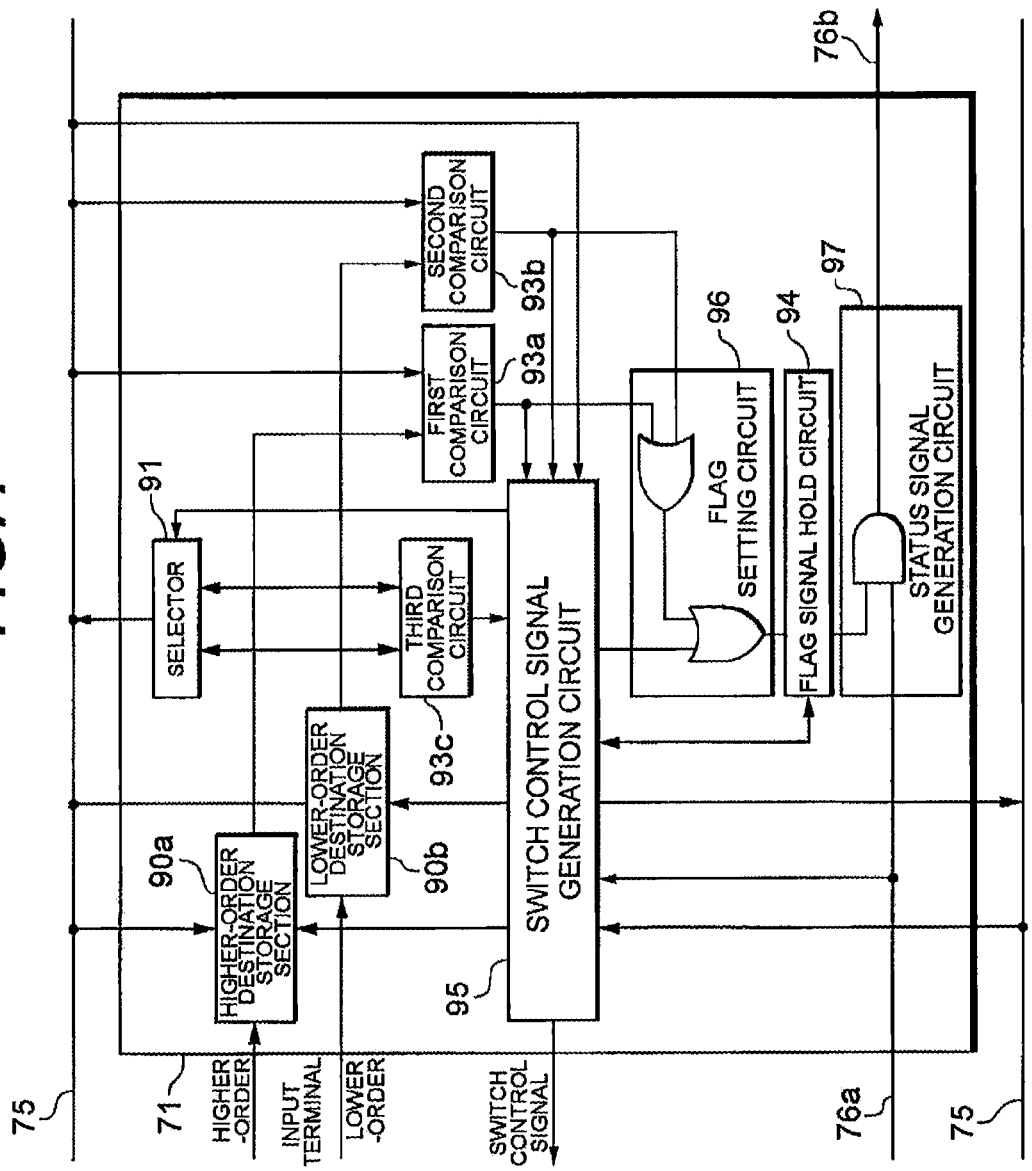
FIG. 4 is a block diagram of the first control element shown in FIG. 3.
Figure 5:
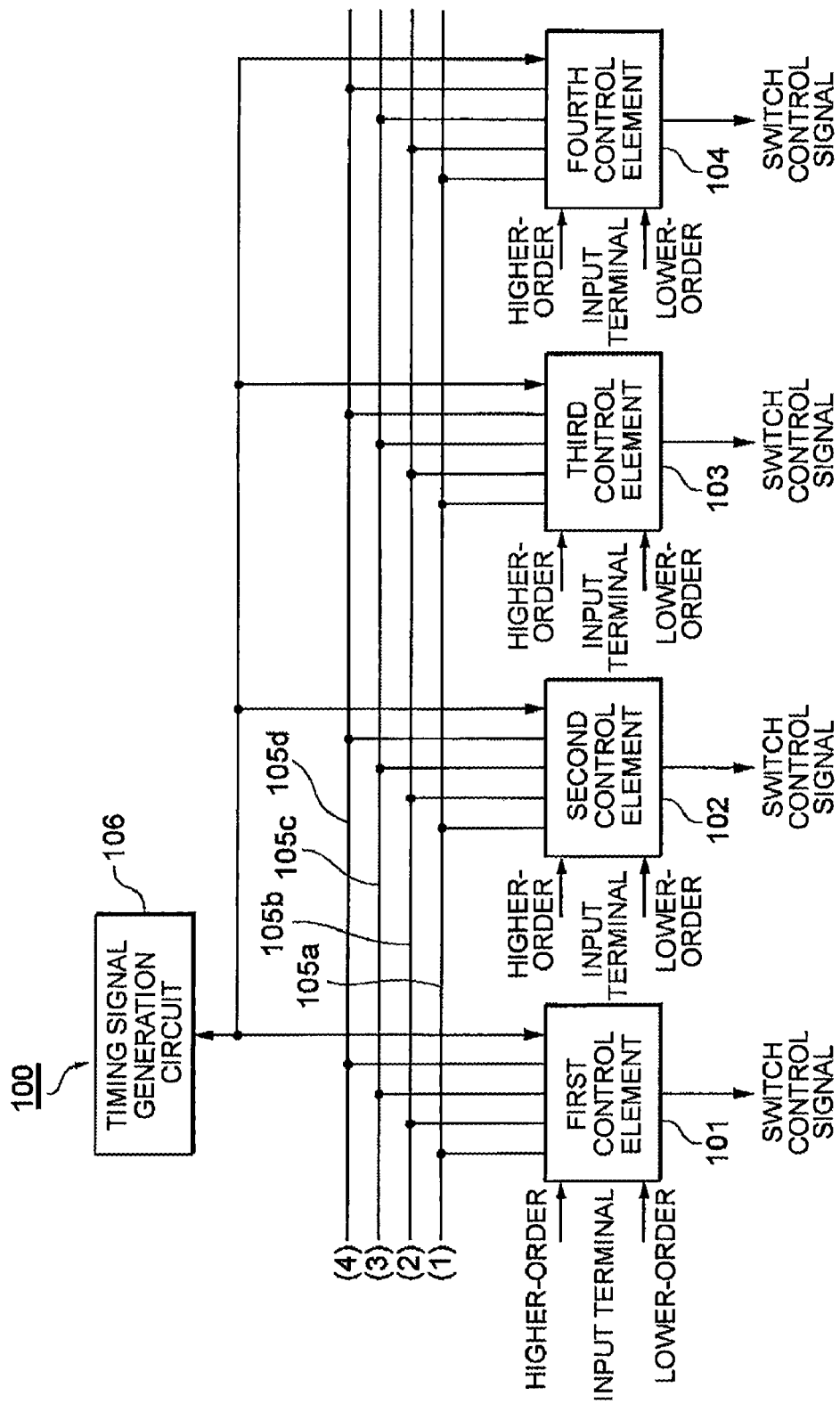
FIG. 5 is a block diagram of a switch control circuit in accordance with another embodiment.
Figure 6:
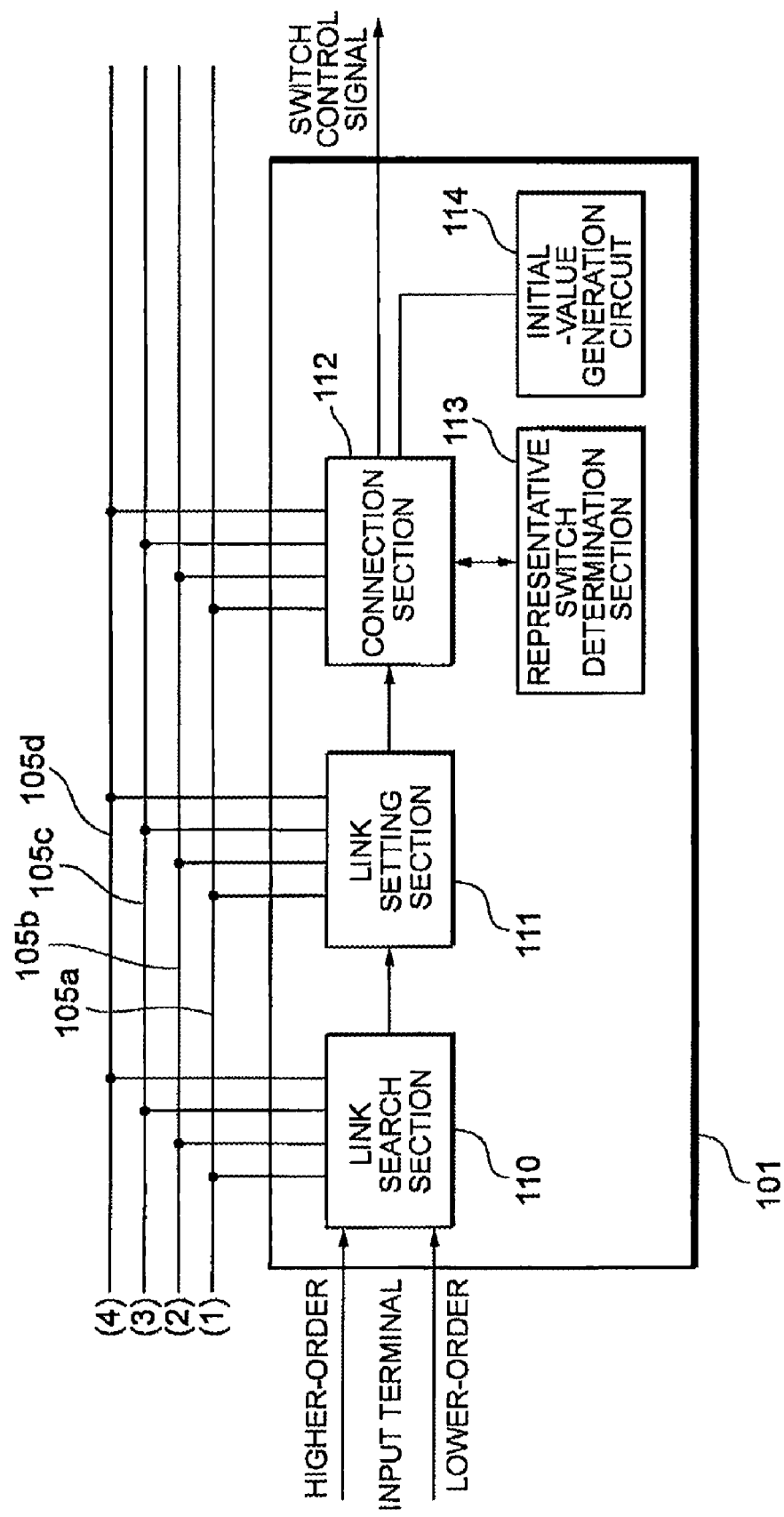
FIG. 6 is a block diagram of the first control element shown in FIG. 5.
Figure 7:
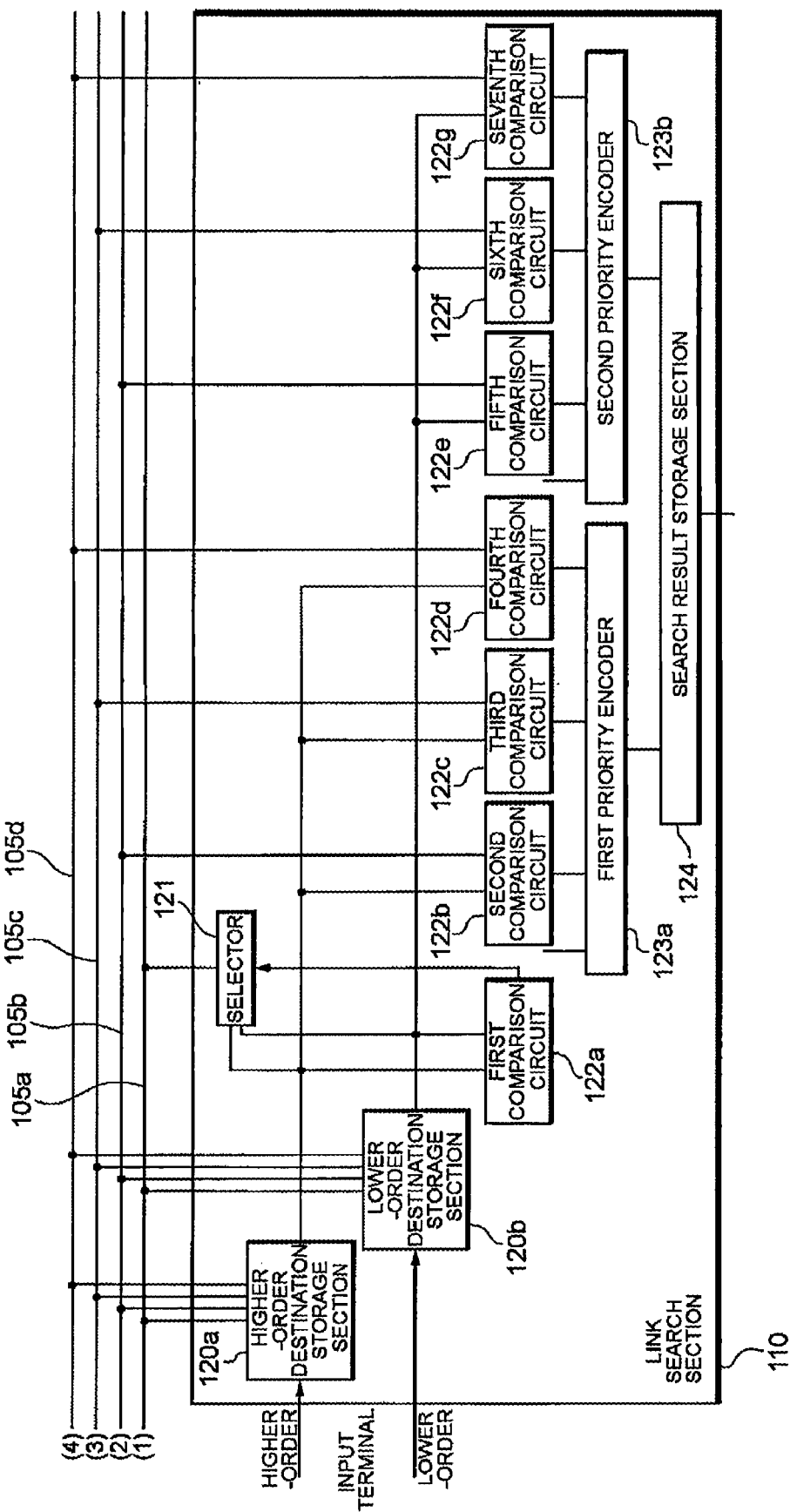
FIG. 7 is a block diagram of the link search section shown in FIG. 6.

2 Benes network
3a to 3h Input ports
4a to 4h Input ports
5a to 5e Switch stages
6a, 6b Higher-order and lower-order intermediate switches
10 Unit switch
11 to 14 First to fourth unit switches
21 to 24 First to fourth unit switches
70 Switch control circuit
71 to 74 First to fourth control elements
75 Bus
75a, 75b First and second sections
76a to 76e 0th to fourth status signal lines
77 Bus switch 78 Timing signal generation circuit
90a, 90b Higher-order and lower-order destination storage sections
91 Selector
93a to 93c First to third comparison circuits
94 Flag signal hold circuit
95 Control circuit
96 Flag setting circuit
97 Status signal generation circuit
100 Switch control circuit
101 to 104 First to fourth elements
105a to 105d First to fourth buses
106 Timing signal generation circuit
110 Link search section
111 Link setting section
112 Connection section
113 Representative switch determination section
114 Initial-value generation circuit
120a, 120b Higher-order and lower-order destination storage sections
121 Selector
122a to 122g First to seventh comparison circuits
123a, 123b First and second priority encoders
124 Search result storage section
131 to 134 Search results
141, 142 First and second output signal groups
143a to 143f First to sixth output signals
150 Resister
151 Multiplexer
152 Output buffer
153 Input buffer
154 XOR circuit
155 SR flip-flop

The invention claimed is:

1. A multistage control circuit which, for a multistage switch that arranges a plurality of switch stages having a plurality of unit switches which can switch routes between input and output by setting between a plurality of input ports and a plurality of output ports discriminated by destination address and connects the plurality of switch stages in accordance with a predetermined rule, constructs a transmission route from said input port to said output port in accordance with said destination address designated for each said input port by setting the unit switch for each switch stage, comprising a bus, a plurality of control elements, and cluster formation means, wherein said bus is connected to all said control elements, said control element comprises transmitting/receiving means for performing transmission/reception of said destination address with respect to another said control element through the bus, comparison means for comparing said destination address designated for said unit switch corresponding to oneself with said destination address designated for said unit switch corresponding to another said control element, and switch control signal generation means for generating a switch control signal setting said unit switch corresponding to oneself on the basis of a comparison result of said comparison means, and said cluster formation means divides said plurality of control elements into a plurality of clusters by defining a range within which said destination address is transmitted/received.

2. The multistage switch control circuit according to claim 1, wherein said cluster formation means has a bus switch for dividing said bus.

3. The multistage switch control circuit according to claim 1, wherein said cluster formation means defines the range within which said destination address is transmitted/received by masking said destination address transmitted from another said cluster out of said destination addresses received by said cluster.

4. The multistage switch control circuit according to claim 3, wherein said control element further comprises status signal generation means for generating a status signal indicating whether or not a setting for said unit switch corresponding to oneself has been determined.

5. The multistage switch control circuit according to claim 4, wherein said multistage switch is a Benes network which has 2N said input ports and 2N said output ports satisfying $2N=2^n$ (where n is an integer of 2 or more) and arranges $(2n-1)$ 2N-input/2N-output switch stages having N 2-input/2-output said unit switches between said input ports and said output ports, and said cluster formation means forms $2k-1$ clusters when the k-th (where k is an integer from 1 to $(2n-1)$) switch stage from said input ports is an object to be controlled.

6. The multistage switch control circuit according to claim 5 which determines the presence or absence of a link relationship and a difference in setting between one of said control elements and other of control elements on the basis of said destination address designated for said unit switch corresponding to said one of said control elements, selects a representative element from a group comprising said control elements having said link relationship on the basis of identification numbers assigned to said control elements, and determines said setting for said unit switch corresponding to said representative element, thereby following said link relationship and determining said setting for another said unit switch, wherein said control elements correspond to different buses, respectively, and each one of said control elements connects said bus corresponding to the other control element having a link relationship with said one of said control elements, transmit said identification numbers to said bus connected thereto, and determine a representative node using wired OR processing.

* * * * *

UNITED STATES PATENT AND TRADEMARK OFFICE
CERTIFICATE OF CORRECTION

PATENT NO. : 8,059,640 B2
APPLICATION NO. : 12/521114
DATED : November 15, 2011
INVENTOR(S) : Obara et al.

It is certified that error appears in the above-identified patent and that said Letters Patent is hereby corrected as shown below:

On the Title Page, in Item (56), under "OTHER PUBLICATIONS", in Column 2, Line 5, delete "Neworks,"" and insert -- Networks," --, therefor.

Figure 9:
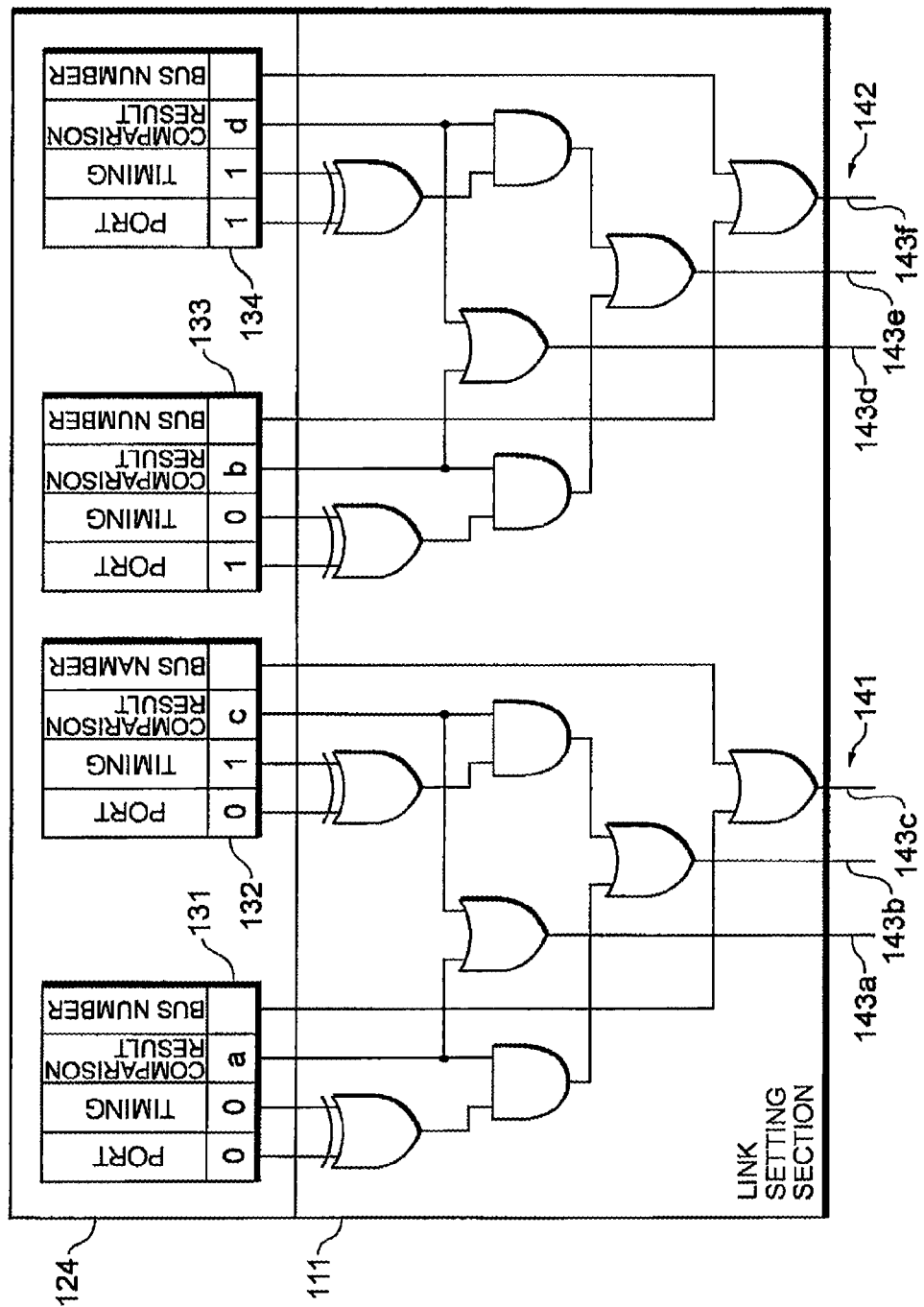
FIG. 9 is a block diagram of the link setting section shown in FIG. 6.
Figure 10:
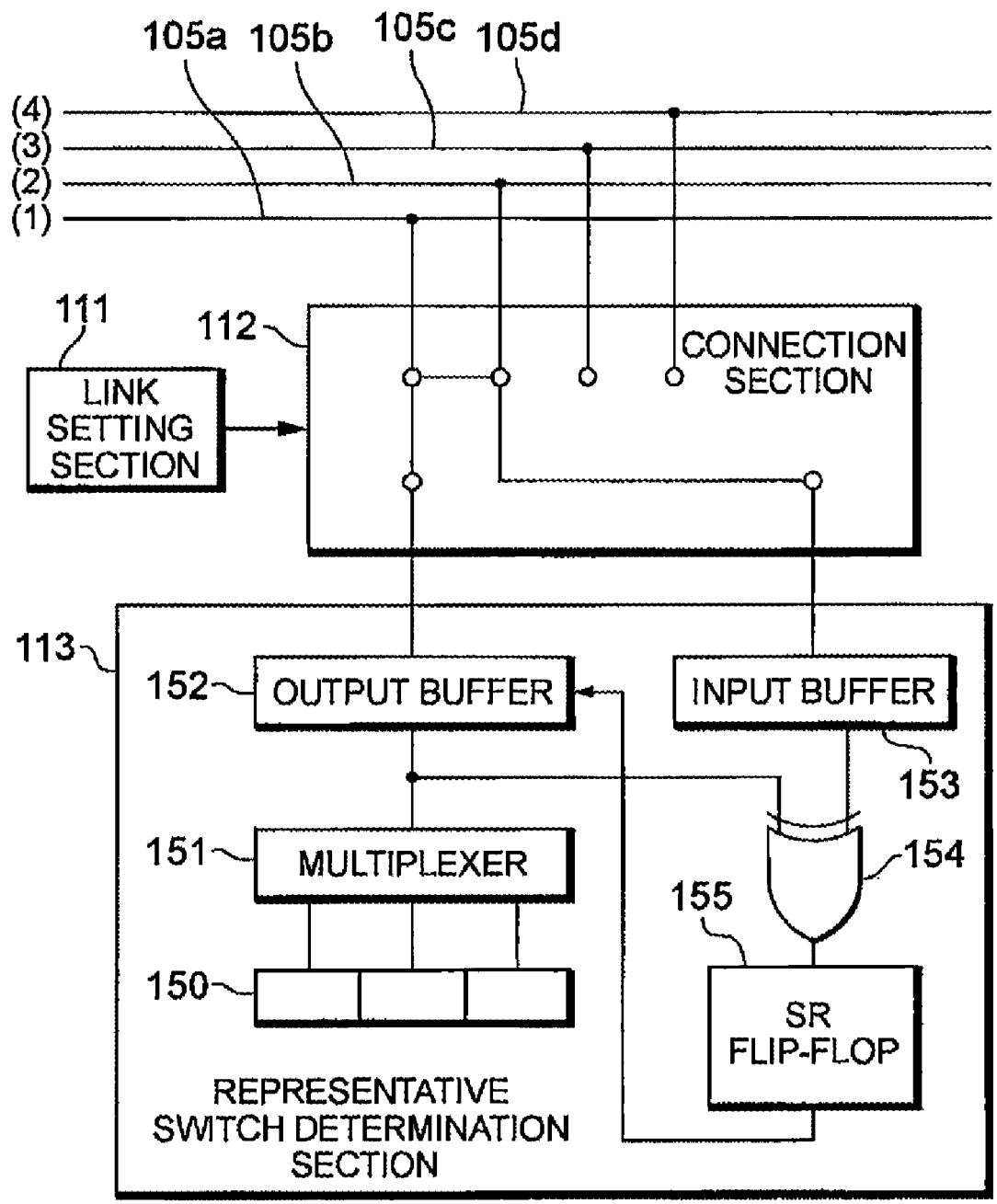
FIG. 10 is a block diagram of a representative switch determination section shown in FIG. 6.
Figure 11:
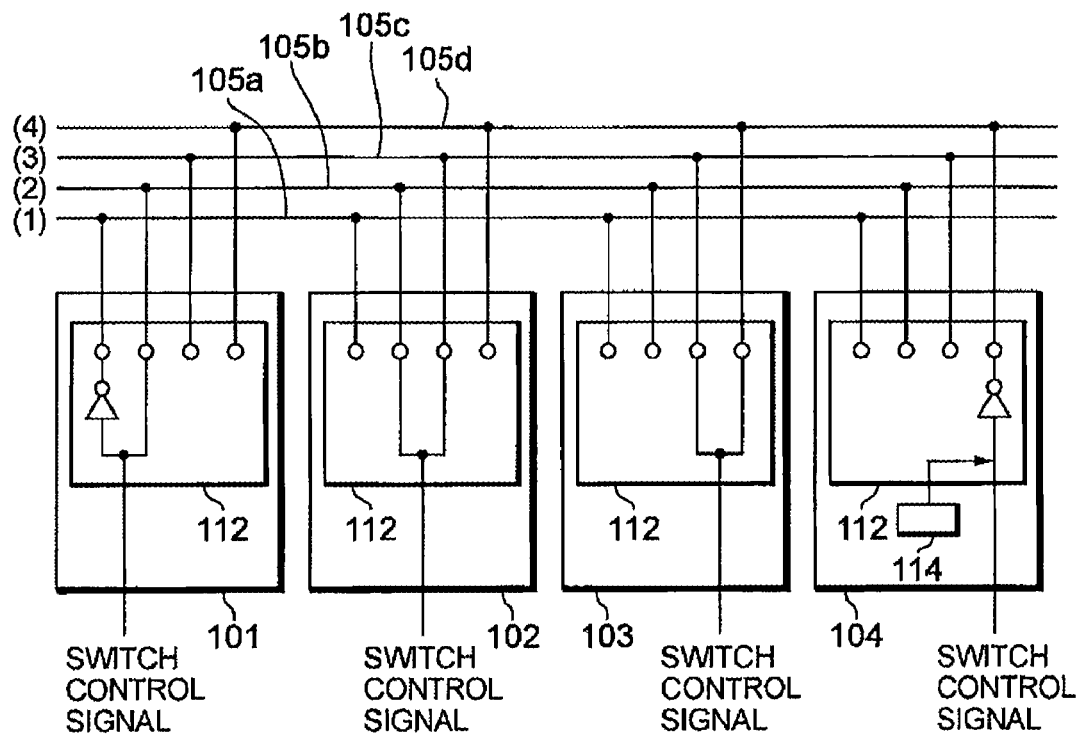
FIG. 11 is a block diagram indicating a connection example after the switch setting processing of the connection section shown in FIG. 5.

In the Drawings:

In Fig. 9, Sheet 9 of 11, for Tag "132", in Line 4, delete "NAMBER" and insert -- NUMBER --, therefor.

In the Specification:

In Column 2, Line 11, delete "1063" and insert -- 1063. --, therefor.

In Column 2, Line 16, delete "334" and insert -- 334. --, therefor.

In Column 4, Line 17, delete "DESCRIPTION" and insert -- DETAILED DESCRIPTION --, therefor.

In Column 8, Line 23, delete "indicate." and insert -- indicate --, therefor.

In Column 9, Line 56, delete "(1)," and insert -- (1 value), --, therefor.

In Column 11, Line 23, delete "duster" and insert -- cluster --, therefor.

In Column 11, Line 28, delete "duster" and insert -- cluster --, therefor.

In Column 11, Line 30, delete "duster," and insert -- cluster, --, therefor.

In Column 11, Line 31, delete "duster." and insert -- cluster. --, therefor.

Signed and Sealed this
Eleventh Day of June, 2013

Teresa Stanek Rea
*Acting Director of the United States Patent and Trademark Office*

CERTIFICATE OF CORRECTION (continued)
U.S. Pat. No. 8,059,640 B2

In Column 11, Line 60, delete "dock" and insert -- clock --, therefor.

In Column 13, Line 9, delete "duster" and insert -- cluster --, therefor.

In Column 15, Line 31, delete "transmission" and insert -- transmission. --, therefor.

In Column 18, Line 6, delete "ease" and insert -- case --, therefor.

In Column 18, Line 19, delete "dusters" and insert -- clusters --, therefor.

In Column 18, Line 20, delete "duster" and insert -- cluster --, therefor.

In Column 18, Line 22, delete "duster," and insert -- cluster, --, therefor.

In Column 18, Line 27, delete "is to" and insert -- to --, therefor.

In the Claims

In Column 20, Line 34, in Claim 6, delete "5" and insert -- 5, --, therefor.